US009800841B2

(12) United States Patent
Yang

(10) Patent No.: US 9,800,841 B2
(45) Date of Patent: Oct. 24, 2017

(54) METHOD, APPARATUS, AND SYSTEM FOR ACQUIRING VISUAL ANGLE

(71) Applicant: Huawei Technologies Co., Ltd., Shenzhen, Guangdong (CN)

(72) Inventor: Zhiquan Yang, Hangzhou (CN)

(73) Assignee: Huawei Technologies Co., Ltd., Shenzhen (CN)

(*) Notice: Subject to any disclaimer, the term of this patent is extended or adjusted under 35 U.S.C. 154(b) by 317 days.

(21) Appl. No.: 14/145,062

(22) Filed: Dec. 31, 2013

(65) Prior Publication Data
US 2014/0111643 A1    Apr. 24, 2014

Related U.S. Application Data

(63) Continuation of application No. PCT/CN2012/084061, filed on Nov. 5, 2012.

(30) Foreign Application Priority Data

Nov. 8, 2011    (CN) .......................... 2011 1 0350441

(51) Int. Cl.
H04N 7/18    (2006.01)
G01S 3/786    (2006.01)
(Continued)

(52) U.S. Cl.
CPC .............. H04N 7/183 (2013.01); G01S 3/786 (2013.01); H04N 5/23206 (2013.01);
(Continued)

(58) Field of Classification Search
CPC ................ G01S 3/786; G08B 13/1963; G08B 13/19636; H04N 5/23206; H04N 7/18; H04N 7/183
(Continued)

(56) References Cited

U.S. PATENT DOCUMENTS 4,768,469 A * 9/1988 Ilzuka ..................... F23N 5/082
110/101 CD
6,545,708 B1    4/2003 Tamayama et al.
(Continued)

FOREIGN PATENT DOCUMENTS

CN    1554193 A    12/2004
FR    2961919 A1    12/2011

OTHER PUBLICATIONS

Li et al, Detection and Tracking of Moving Objects Based on PTZ camera, 2012.*

(Continued)

Primary Examiner — Shan Elahi

(57) ABSTRACT

Embodiments of the present invention relate to the field of video monitoring and provide a method, an apparatus, and a system for acquiring a visual angle, so as to acquire an accurate visual angle value. The method for acquiring a visual angle includes: receiving, by a central processing unit CPU of a camera, angle information that is sent by an accelerometer sensor arranged on the camera; converting, by the CPU, the received angle information to a visual angle value; sending, by the CPU, the visual angle value to a server, so that a client receives the visual angle value forwarded by the server. The embodiments of the present invention are applicable to a video monitoring scenario.

13 Claims, 3 Drawing Sheets

(51) Int. Cl.
*H04N 5/232* (2006.01)
*G08B 13/196* (2006.01)

(52) U.S. Cl.
CPC ........... *H04N 7/18* (2013.01); *G08B 13/1963* (2013.01); *G08B 13/19636* (2013.01)

(58) Field of Classification Search
USPC ........................................................ 348/143
See application file for complete search history.

(56) References Cited

U.S. PATENT DOCUMENTS

| | | | |
|---|---|---|---|
| 6,567,121 B1 | 5/2003 | Kuno | |
| 6,727,940 B1 | 4/2004 | Oka et al. | |
| 8,264,524 B1* | 9/2012 | Davey | H04N 5/23206 345/419 |
| 8,276,286 B2* | 10/2012 | Bailey et al. | 33/503 |
| 8,589,886 B2* | 11/2013 | Lavie | G06F 11/263 702/108 |
| 8,625,106 B2 | 1/2014 | Ossig et al. | 356/601 |
| 8,638,446 B2 | 1/2014 | Briggs | 356/603 |
| 8,683,709 B2 | 4/2014 | York | 33/503 |
| 9,292,187 B2* | 3/2016 | Whitman | G06F 3/0481 |
| 2005/0036036 A1* | 2/2005 | Stevenson | G08B 13/19608 348/211.99 |
| 2006/0125921 A1* | 6/2006 | Foote | G06T 3/4038 348/159 |
| 2006/0187305 A1* | 8/2006 | Trivedi | G06K 9/00234 348/169 |
| 2007/0109409 A1* | 5/2007 | Yea | H04N 7/181 348/153 |
| 2008/0154538 A1* | 6/2008 | Stathis | G01C 15/002 702/152 |
| 2008/0177646 A1* | 7/2008 | Frink | G06Q 10/1091 705/32 |
| 2008/0291279 A1* | 11/2008 | Samarasekera | G08B 13/19693 348/159 |
| 2009/0254843 A1* | 10/2009 | Van Wie | H04L 12/1822 715/757 |
| 2009/0262183 A1* | 10/2009 | Hayashi | G02B 21/365 348/46 |
| 2009/0262206 A1* | 10/2009 | Park | G08B 13/19641 348/218.1 |
| 2009/0303204 A1 | 12/2009 | Nasiri et al. | |
| 2010/0002070 A1* | 1/2010 | Ahiska | G08B 13/19691 348/36 |
| 2010/0020068 A1* | 1/2010 | House | G06T 15/20 345/419 |
| 2010/0026809 A1* | 2/2010 | Curry | H04N 5/222 348/157 |
| 2010/0135291 A1* | 6/2010 | Martin | H04L 45/00 370/389 |
| 2010/0157070 A1* | 6/2010 | Mohanty | H04N 5/23248 348/208.1 |
| 2010/0201621 A1* | 8/2010 | Niikawa | G06F 3/013 345/158 |
| 2011/0128350 A1 | 6/2011 | Oliver et al. | |
| 2012/0069131 A1* | 3/2012 | Abelow | G06Q 10/067 348/14.01 |
| 2012/0119879 A1* | 5/2012 | Estes | G08B 13/19641 340/8.1 |
| 2013/0070093 A1* | 3/2013 | Rivera | G11B 27/002 348/143 |
| 2014/0340465 A1* | 11/2014 | Shi | H04N 7/15 348/14.03 |
| 2016/0086108 A1* | 3/2016 | Abelow | G06Q 10/067 705/7.29 |
| 2016/0117786 A1* | 4/2016 | Packes | H04L 51/36 705/315 |

OTHER PUBLICATIONS

Micheloni et al, Video Analysis in Pan-Tilt-Zoom Camera Networks, 2010.*
Everts et al, Cooperative Object Tracking with Multiple PTZ camera, 2007.*

* cited by examiner

METHOD, APPARATUS, AND SYSTEM FOR ACQUIRING VISUAL ANGLE

CROSS-REFERENCE TO RELATED APPLICATIONS

This application is a continuation of International Application No. PCT/CN2012/084061, filed on Nov. 5, 2012, which claims priority to Chinese Patent Application No. 201110350441.0, filed on Nov. 8, 2011, both of which are hereby incorporated by reference in their entireties.

TECHNICAL FIELD

The present invention relates to the field of video monitoring, and in particular, to a method, a camera, a server, and a system for acquiring a visual angle.

BACKGROUND

A common video monitoring network is shown in FIG. 1, and the video monitoring network includes a camera, a server, a client, and an IP network for interaction between the three. The camera mainly performs collection and coding of audio and video data, and the like. The server mainly performs camera device management, client management, service process management, data storage, and the like. The client mainly provides an operation and management entrance for video services.

However, in an existing solution, a user can only estimate a visual angle of the camera but not able to acquire accurate information about the visual angle.

SUMMARY

Embodiments of the present invention provide a method, a camera, a server, and a system for acquiring a visual angle, so as to acquire an accurate visual angle value.

The embodiments of the present invention use the following technical solutions to attain the foregoing objectives:

In one aspect, a method for acquiring a visual angle is provided, including:

receiving, by a central processing unit CPU of a camera, angle information that is sent by an accelerometer sensor arranged on the camera;

converting, by the CPU, the received angle information to a visual angle value; and sending, by the CPU, the visual angle value to a server, so that a client receives the visual angle value forwarded by the server.

In one aspect, a camera is provided, including: a central processing unit CPU, a pan-tilt-zoom control board, and an accelerometer sensor, where:

the CPU is configured to receive angle information that is sent by the accelerometer sensor arranged on the camera; convert the received angle information to a visual angle value; and send the visual angle value to a server, so that a client receives the visual angle value forwarded by the server.

In still another aspect, an embodiment of the present invention provides a system for acquiring a visual angle, including: a camera, a server, and a client, where the camera is the foregoing camera, the server is the foregoing server, and the client is configured to receive a visual angle value sent by the server.

According to the method, the camera, the server, and the system for acquiring a visual angle that are provided in the embodiments of the present invention, angle information that is sent by an accelerometer sensor arranged on a camera is converted to a visual angle value, the visual angle value is sent to a server, and then the visual angle value is sent to a client by the server. In this way, the visual angle value can be displayed on the client. Compared with a condition of estimating the visual angle in the prior art, the visual angle value displayed on the client is more accurate in the embodiments of the present invention.

BRIEF DESCRIPTION OF THE DRAWINGS

To illustrate the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Embodiment 1

Figure 1:
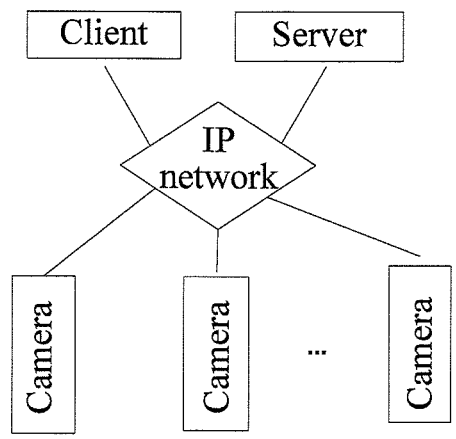
FIG. 1 is a video monitoring system in the prior art.
Figure 2:
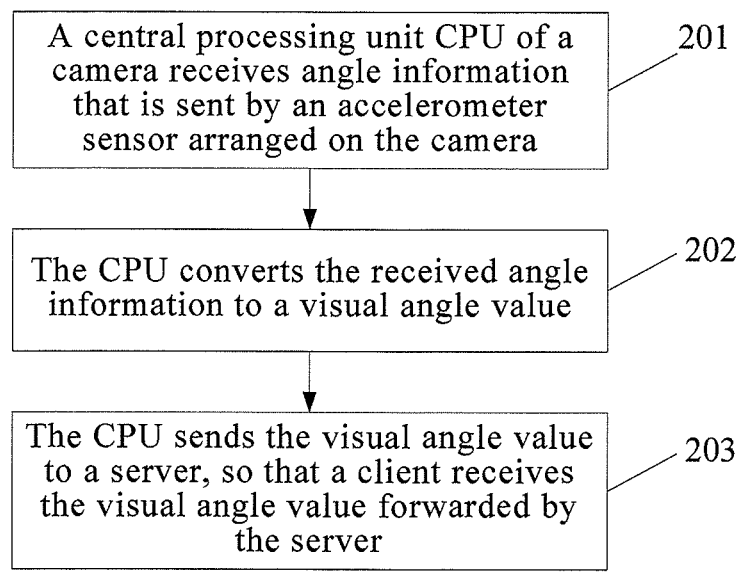
FIG. 2 is a flowchart of a method for acquiring a visual angle according to Embodiment 1 of the present invention.

In one aspect, as shown in FIG. 2, the embodiment of the present invention provides a method for acquiring a visual angle, including:

201. A central processing unit CPU of a camera receives angle information that is sent by an accelerometer sensor arranged on the camera.

202. The CPU converts the received angle information to a visual angle value.

203. The CPU sends the visual angle value to a server, so that a client receives the visual angle value forwarded by the server.

According to the method for acquiring a visual angle that is provided in the embodiment of the present invention, angle information that is sent by an accelerometer sensor arranged on a camera is converted to a visual angle value, the visual angle value is sent to a server, and then the visual angle value is sent to a client by the server. In this way, the current visual angle value can be displayed on the client. Compared with a condition of estimating the visual angle in the prior art, the visual angle value displayed on the client is more accurate in the embodiment of the present invention.

Embodiment 2

Figure 3:
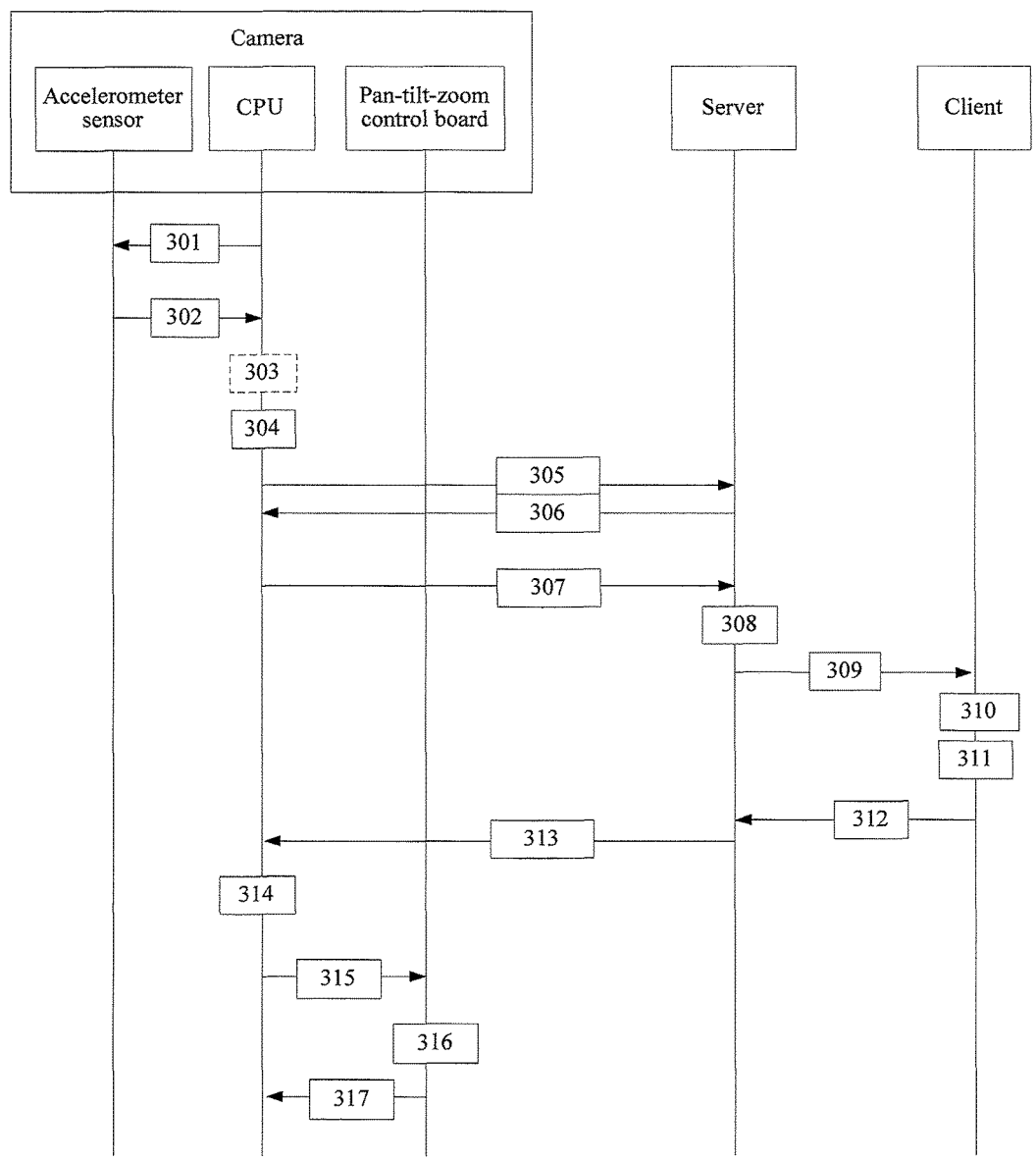
FIG. 3 is a signaling interaction diagram of a method for acquiring a visual angle according to Embodiment 2 of the present invention.

As shown in FIG. 3, a signaling interaction process of acquiring a visual angle is provided in the embodiment of the present invention, including:

301. A central processing unit CPU of a camera sends a command requesting angle information to an accelerometer sensor arranged on the camera.

In all embodiments of the present invention, the accelerometer sensor arranged on the camera is capable of measuring the angle information of the camera. The accelerometer sensor may be a three-axis accelerometer sensor or a two-axis accelerometer sensor. The three-axis accelerometer sensor may measure three-dimensional angle information (an X-Y-Z three-dimensional angle value) or two-dimensional angle information (an X-Y two-dimensional angle value, a Y-Z two-dimensional angle value, or an X-Z two-dimensional angle value). The two-axis accelerometer sensor may measure a two-dimensional angle information (an X-Y two-dimensional angle value, a Y-Z two-dimensional angle value, or an X-Z two-dimensional angle value). During a specific using process, an appropriate accelerometer sensor should be selected in consideration of factors such as a visual effect and a production cost. In the embodiment of the present invention, the three-dimensional angle information (the X-Y-Z three-dimensional angle value) measured by the three-axis accelerometer sensor is used as an example of the angle information for description.

302. The accelerometer sensor sends the three-dimensional angle information (the X-Y-Z three-dimensional angle value) to the CPU.

When it is the first time the CPU of the camera reports the visual angle value to the server, step 304 is directly performed; when it is not the first time the CPU of the camera reports the visual angle value to the server, step 303 needs to be performed first.

303. The CPU cyclically determines whether the three-dimensional angle information (the X-Y-Z three-dimensional angle value) received this time is consistent with that received last time; and if the angle information received this time is inconsistent with that received last time, performs a next step 304.

That is, the CPU cyclically performs steps 301 and 302 until after step 303, it determines that the angle information received this time (any time except for the first time) is inconsistent with that received last time, and continues to perform the following step by using the angle information received this time.

304. The CPU converts the received three-dimensional angle information (the X-Y-Z three-dimensional angle value) to a three-dimensional visual angle value (an X-Y-Z visual angle value). During the conversion process, the CPU performs conversion between the angle information and the visual angle value by using a predetermined algorithm.

305. The server sends a command of adding a camera to the CPU. It should be noted that the number of cameras to be added by the server is not limited in the embodiment of the present invention. The server may send the command of adding a camera to CPUs of multiple cameras, so that a client is capable of monitoring visual angle values of the multiple cameras. In an interaction process in this embodiment, only an interaction process of the server and one camera is described.

306. The camera establishes a connection with the server and returns a response to show adding of a device is completed.

307. The CPU sends the three-dimensional visual angle value (the X-Y-Z visual angle value) to the server. In the embodiment of the present invention, a process where the CPU sends the three-dimensional visual angle value (the X-Y-Z visual angle value) to the server may be as follows: The CPU actively reports the three-dimensional visual angle value, that is, the CPU actively performs the foregoing steps 301-307, for example, when a camera is added to the server, the CPU of the camera starts to actively report the three-dimensional visual angle value or the CPU sends the visual angle value to the server according to request information of the server, that is, the CPU passively sends the three-dimensional visual angle value to the server, for example, after receiving the request information of the client forwarded by the server, the CPU performs steps 301-307 to send the three-dimensional visual angle value to the server.

308. The server stores the three-dimensional visual angle value (the X-Y-Z visual angle value). The three-dimensional visual angle value is stored by the server. In this way, other clients may share the three-dimensional visual angle value, so that a visual range corresponding to the three-dimensional visual angle value can be monitored on other clients.

309. The server sends the visual angle value to the client. In the embodiment of the present invention, a process where the server sends the three-dimensional visual angle value (the X-Y-Z visual angle value) to the client may be as follows: The server actively reports the three-dimensional visual angle value to the client; or the server sends the three-dimensional visual angle value to the client according to request information sent by the client, that is, the server passively sends the three-dimensional visual angle value to the client.

Figure 4:
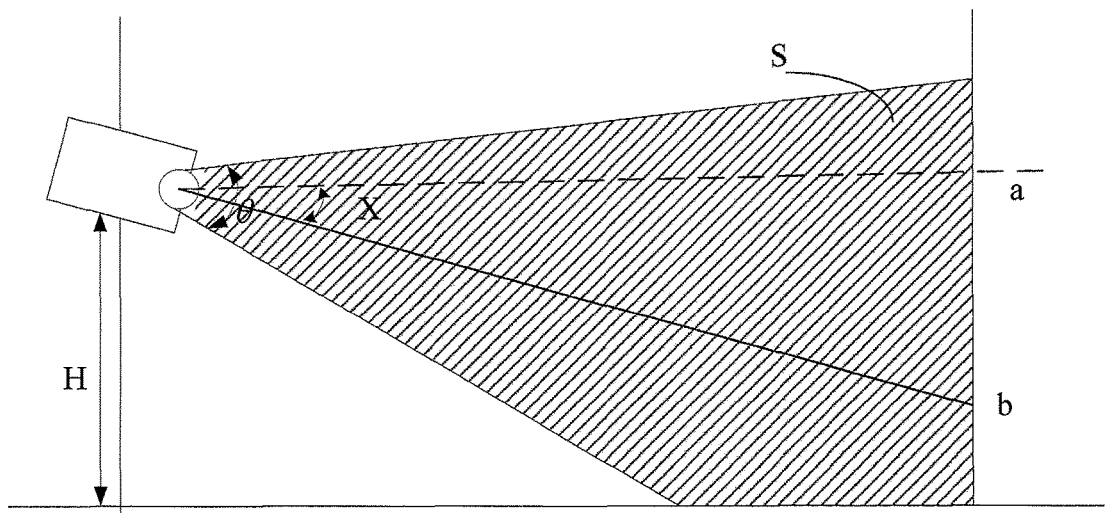
FIG. 4 is an effect diagram of a longitudinal visual range.

310. The client displays the three-dimensional visual angle value, calculates a current visual range according to the three-dimensional visual angle value (the X-Y-Z visual angle value), and displays the current visual range. For example, as shown in FIG. 4, "a" is horizontal line a, "b" is a visual midline, in a condition that installation height H, a horizontal visual angle value X, and camera lens parameters of a camera are known, a vertical visual range S of the camera may be learned by using a predetermined algorithm, where the predetermined algorithm may be multiple algorithms and is easily obtained according to a geometrical relationship, and therefore no further details are provided in the embodiment of the present invention.

The current precise visual angle value and visual range of the camera may be learned on the client by using steps 301-310. Further, if an operator needs to adjust the camera to a specified position by performing a remote operation, the following steps may be performed for implementation.

311. The client receives a specified three-dimensional visual angle value (an X-Y-Z visual angle value), where the specified three-dimensional visual angle value is generally input by the operator by using a controlling interface on the client.

312. The client sends the specified three-dimensional visual angle value (the X-Y-Z visual angle value) to the server.

313. The server sends the specified three-dimensional visual angle value (the X-Y-Z visual angle value) to the CPU.

314. The CPU converts the specified three-dimensional visual angle value (the X-Y-Z visual angle value) to a pan-tilt-zoom rotation angle.

315. The CPU sends the pan-tilt-zoom rotation angle to a pan-tilt-zoom control board.

316. The pan-tilt-zoom control board controls the camera to rotate to a specified angle.

317. The pan-tilt-zoom control board responds to the CPU that processing is completed.

After steps 311-317, the camera is precisely adjusted to the specified angle according to the visual angle value specified by the operator. In this way, the required visual angle value is implemented on the client by using the remote operation.

According to the method for acquiring a visual angle that is provided in the embodiment of the present invention, angle information that is sent by an accelerometer sensor arranged on a camera is converted to a visual angle value, the visual angle value is sent to a server, and then the visual angle value is sent to a client by the server. In this way, a precise visual angle value can be displayed on the client, and a visual range can be calculated according to the visual angle value. Compared with a condition of estimating the visual angle in the prior art, the visual angle value and the visual range that are displayed on the client are more precise in the embodiment of the present invention.

Embodiment 3

The embodiment of the present invention provides a camera, including: a central processing unit CPU, a pan-tilt-zoom control board, and an accelerometer sensor.

The CPU is configured to receive angle information that is sent by the accelerometer sensor arranged on the camera; convert the received angle information to a visual angle value; and send the visual angle value to a server, so that a client receives the visual angle value forwarded by the server. The accelerometer sensor may be a three-axis accelerometer sensor or a two-axis accelerometer sensor. The three-axis accelerometer sensor may measure three-dimensional angle information (an X-Y-Z three-dimensional angle value) or two-dimensional angle information (an X-Y two-dimensional angle value, a Y-Z two-dimensional angle value, or an X-Z two-dimensional angle value). The two-axis accelerometer sensor may measure a two-dimensional angle information (an X-Y two-dimensional angle value, a Y-Z two-dimensional angle value, or an X-Z two-dimensional angle value). During a specific using process, an appropriate accelerometer sensor should be selected in consideration of factors such as a visual effect and a production cost. In the embodiment of the present invention, a process where the CPU sends the visual angle value to the server may be as follows: The CPU actively reports the visual angle value, for example, when a camera is added to the server, the CPU of the camera starts to report the visual angle value to the server; or the CPU sends the visual angle value to the server according to request information of the server, that is, the CPU passively sends the visual angle value to the server, for example, the CPU sends the visual angle value to the server after receiving the request information of the client forwarded by the server.

Further, the CPU is further configured to cyclically determine whether angle information received this time is consistent with that received last time, and if the angle information received this time is inconsistent with that received last time, perform a next step. It should be noted that a cyclic determination function of the CPU is not used when it is the first time the CPU of the camera reports the visual angle value to the server; and the cyclic determination function of the CPU needs to be used when it is not the first time the CPU of the camera reports the visual angle value to the server.

Further, the CPU is further configured to receive a specified visual angle value sent by the server; convert the specified visual angle value to a pan-tilt-zoom rotation angle; and send the pan-tilt-zoom rotation angle to the pan-tilt-zoom control board, so that the pan-tilt-zoom control board controls the camera to rotate to a specified angle.

The embodiment of the present invention further provides a server, where the server is configured to receive a visual angle value sent by a central processing unit CPU of a camera and send the visual angle value to a client. In the embodiment of the present invention, a process where the server sends the visual angle value to the client may be as follows: The server performs active reporting; or the server sends the visual angle value to the client according to request information sent by the client, that is, the server passively sends the visual angle value to the client.

Further, the server is further configured to store the visual angle value. The visual angle value is stored by the server. In this way, other clients may share the visual angle value so that a visual range corresponding to the visual angle value can be monitored on other clients. The server is further configured to receive a specified visual angle value sent by the client and send the specified visual angle value to the CPU, so that the CPU rotates the camera to a specified angle according to the specified visual angle value.

The embodiment of the present invention further provides a system for acquiring a visual angle, including: a camera, a server, and a client, where the camera is the foregoing camera, the server is the foregoing server, and the client is configured to receive a visual angle value sent by the server.

According to the camera, the server, and the system for acquiring a visual angle that are provided in the embodiment of the present invention, angle information that is sent by an accelerometer sensor arranged on a camera is converted to a visual angle value, the visual angle value is sent to a server, and then the visual angle value is sent to a client by the server. In this way, the current visual angle value can be displayed on the client, and a visual range can be calculated according to the visual angle value. Compared with a condition of estimating the visual angle in the prior art, the visual angle value and the visual range that are displayed on the client are more precise in the embodiment of the present invention.

A person of ordinary skill in the art may understand that, all or a part of the steps of the foregoing method embodiments may be implemented by a program instructing relevant hardware. The foregoing programs may be stored in a computer readable storage medium. When the program runs, the foregoing steps included in the method embodiments are performed. The foregoing storage medium includes various mediums capable of storing program codes, such as a ROM, a RAM, a magnetic disk or an optical disk.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for acquiring a visual angle, the method comprising:
   receiving, by a central processing unit (CPU) of a camera, three-dimensional angle information of the camera that is sent by an accelerometer sensor arranged on the camera;
   converting, by the CPU, the received three-dimensional angle information of the camera to a three-dimensional visual angle value, wherein the three-dimensional visual angle value is used for calculating a visual range of the camera;

sending, by the CPU, the three-dimensional visual angle value to a server;
receiving, by a client device, from the server, the three-dimensional visual angle value;
calculating, by the client device, a current visual range according to the received three-dimensional visual angle value; and
displaying, by the client device, the calculated current visual range.

2. The method according to claim 1, wherein before converting, by the CPU, the received three-dimensional angle information to a three-dimensional visual angle value, the method comprises:
cyclically determining, by the CPU, whether the three-dimensional angle information received currently is consistent with that received previously; and if the three-dimensional angle information received currently is inconsistent with that received previously, performing a next step.

3. The method according to claim 2, further comprising:
receiving, by the CPU, a specified three-dimensional visual angle value sent by the server;
converting, by the CPU, the specified three-dimensional visual angle value to a pan-tilt-zoom rotation angle; and
sending, by the CPU, the pan-tilt-zoom rotation angle to a pan-tilt-zoom control board, so that the pan-tilt-zoom control board controls the camera to rotate to a specified angle.

4. The method according to claim 1, wherein sending, by the CPU, the three-dimensional visual angle value to a server comprises:
actively sending, by the CPU, the three-dimensional visual angle value to the server; or
sending, by the CPU, the three-dimensional visual angle value to the server according to request information of the server.

5. A camera, comprising:
a central processing unit (CPU), a pan-tilt-zoom control board, and an accelerometer sensor, and wherein:
the CPU is configured to:
receive three-dimensional angle information of the camera that is sent by the accelerometer sensor arranged on the camera;
convert the received three-dimensional angle information of the camera to a three-dimensional visual angle value, wherein the three-dimensional visual angle value is used for calculating a visual range of the camera;
send the three-dimensional visual angle value to a server; and
cause a client device to:
receive, from the server, the three-dimensional visual angle value;
calculate a current visual range according to the received three-dimensional visual angle value; and
display the calculated current visual range.

6. The camera according to claim 5, wherein the CPU is further configured to cyclically determine whether the three-dimensional angle information received currently is consistent with that received previously until the three-dimensional angle information received currently is inconsistent with that received previously.

7. The camera according to claim 6, wherein the CPU is further configured to:
receive a three-dimensional specified visual angle value sent by the server;
convert the specified three-dimensional visual angle value to a pan-tilt-zoom rotation angle; and
send the pan-tilt-zoom rotation angle to the pan-tilt-zoom control board, so that the pan-tilt-zoom control board controls the camera to rotate to a specified angle.

8. A system for acquiring a visual angle, comprising:
a server;
a client device; and
a camera, the camera comprising:
a central processing unit (CPU), a pan-tilt-zoom control board, and an accelerometer sensor, wherein:
the CPU is configured to:
receive three-dimensional angle information of the camera that is sent by the accelerometer sensor arranged on the camera,
convert the received three-dimensional angle information of the camera to a three-dimensional visual angle value, wherein the three-dimensional visual angle value is used for calculating a visual range of the camera, and
send the three-dimensional visual angle value to the server;
wherein the server is configured to receive the three-dimensional visual angle value sent by the CPU of the camera and send the three-dimensional visual angle value to the client device;
wherein the client device is configured to:
receive, from the server, the three-dimensional visual angle value;
calculate a current visual range according to the received three-dimensional visual angle value; and
display the calculated current visual range.

9. The system according to claim 8, wherein the CPU is configured to cyclically determine whether the three-dimensional angle information received currently is consistent with that received previously until the three-dimensional angle information received currently is inconsistent with that received previously.

10. The system according to claim 9, wherein the CPU is further configured to:
receive a specified three-dimensional visual angle value sent by the server;
convert the specified three-dimensional visual angle value to a pan-tilt-zoom rotation angle; and
send the pan-tilt-zoom rotation angle to the pan-tilt-zoom control board, so that the pan-tilt-zoom control board controls the camera to rotate to a specified angle.

11. The system according to claim 8, wherein the server is further configured to:
store the three-dimensional visual angle value;
receive a specified three-dimensional visual angle value sent by the client; and
send the specified three-dimensional visual angle value to the CPU, so that the CPU rotates the camera to a specified angle according to the specified visual angle value.

12. The method according to claim 1, further comprising:
sending, by the server, the three-dimensional visual angle value to a client, so that the client calculates the visual range according to the three-dimensional visual angle value.

13. The system according to claim 8, further comprising the client, wherein
the client is configured to calculate the visual range according to the three-dimensional visual angle value.

* * * * *